US012647516B2

(12) United States Patent
Agrawal et al.

(10) Patent No.: US 12,647,516 B2
(45) Date of Patent: Jun. 2, 2026

(54) CONTEXT-BASED INTERACTIVE TELEPHONE SYSTEM NAVIGATION

(71) Applicant: Motorola Mobility LLC, Chicago, IL (US)

(72) Inventors: Amit Kumar Agrawal, Bangalore (IN); Sanjeev Kumar Poluru Venkata, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 100 days.

(21) Appl. No.: 18/363,164

(22) Filed: Aug. 1, 2023

(65) Prior Publication Data

US 2025/0047787 A1 Feb. 6, 2025

(51) Int. Cl.
H04M 3/493 (2006.01)
H04M 3/51 (2006.01)

(52) U.S. Cl.
CPC ......... H04M 3/493 (2013.01); H04M 3/5166 (2013.01)

(58) Field of Classification Search
CPC ............... H04M 3/493; H04M 3/5166; H04M 2201/40; H04M 1/72469
See application file for complete search history.

(56) References Cited

U.S. PATENT DOCUMENTS

| | | | |
|---|---|---|---|
| 5,835,571 A | 11/1998 | Johnson | |
| 7,065,188 B1 | 6/2006 | Mei et al. | |

| | | | |
|---|---|---|---|
| 7,317,789 B2 * | 1/2008 | Comerford | H04M 3/493 704/270.1 |
| 7,515,695 B1 | 4/2009 | Chan et al. | |
| 7,983,401 B1 | 7/2011 | Krinsky et al. | |
| 8,661,112 B2 | 2/2014 | Creamer et al. | |
| 9,172,805 B1 * | 10/2015 | Jayapalan | G10L 13/00 |
| 9,374,464 B1 * | 6/2016 | Demsey | H04M 3/42068 |
| 9,648,164 B1 | 5/2017 | Harris | |
| 10,122,854 B2 | 11/2018 | Chug et al. | |
| 10,148,818 B1 | 12/2018 | Koster | |
| 10,212,283 B1 | 2/2019 | Gao et al. | |
| 10,679,248 B1 * | 6/2020 | Demsey | H04M 3/4936 |
| 10,904,643 B2 | 1/2021 | Gaubitch et al. | |
| 10,944,867 B1 | 3/2021 | Baror et al. | |
| 10,979,568 B1 | 4/2021 | Lu et al. | |
| 11,431,854 B1 * | 8/2022 | Slade | H04L 65/00 |
| 12,500,979 B2 | 12/2025 | Agrawal et al. | |
| 2004/0037401 A1 | 2/2004 | Dow et al. | |
| 2005/0117730 A1 * | 6/2005 | Mullis | H04M 3/54 379/211.02 |
| 2007/0248218 A1 | 10/2007 | Comerford | |

(Continued)

OTHER PUBLICATIONS

"Non-Final Office Action", U.S. Appl. No. 18/363,145, Jan. 10, 2025, 19 pages.

(Continued)

*Primary Examiner* — Akelaw Teshale
(74) *Attorney, Agent, or Firm* — FIG. 1 Patents

(57) ABSTRACT

In aspects of context-based interactive telephone menu navigation, a media device obtains an interactive telephone menu associated with a product correlated with a user profile. The media device identifies an automated navigation of the interactive telephone menu based on the product and injects one or more automated menu inputs of the automated navigation to reach a navigation point of the interactive telephone menu associated with the product.

20 Claims, 6 Drawing Sheets

(56)      References Cited

U.S. PATENT DOCUMENTS

| | | | |
|---|---|---|---|
| 2008/0144804 A1 | 6/2008 | Mergen | |
| 2011/0069828 A1 | 3/2011 | Erhart et al. | |
| 2011/0119138 A1 | 5/2011 | Rakers et al. | |
| 2011/0238414 A1 | 9/2011 | Ju et al. | |
| 2015/0078538 A1* | 3/2015 | Jain | H04M 3/493 |
| | | | 379/88.01 |
| 2015/0188959 A1 | 7/2015 | Sayed | |
| 2015/0215455 A1* | 7/2015 | Perotti | H04M 3/493 |
| | | | 379/88.01 |
| 2015/0255063 A1 | 9/2015 | Talwar et al. | |
| 2015/0264175 A1 | 9/2015 | Bumarch, III et al. | |
| 2016/0070533 A1 | 3/2016 | Foster | |
| 2017/0004828 A1 | 1/2017 | Lee et al. | |
| 2018/0234545 A1* | 8/2018 | Barak | H04M 3/527 |
| 2020/0162613 A1* | 5/2020 | Barak | H04M 3/493 |
| 2020/0228651 A1* | 7/2020 | Demsey | H04M 3/42068 |
| 2021/0281682 A1 | 9/2021 | Agarwal et al. | |
| 2024/0135011 A1* | 4/2024 | Westlake | G06Q 20/425 |
| 2025/0047786 A1 | 2/2025 | Agrawal et al. | |

OTHER PUBLICATIONS

"Corrected Notice of Allowability", U.S. Appl.No. 18/363,145, Nov. 18, 2025, 2 pages.

"Notice of Allowance", U.S. Appl. No. 18/363,145, Nov. 4, 2025, 18 pages.

"Final Office Action", U.S. Appl. No. 18/363,145, Jul. 11, 2025, 23 pages.

\* cited by examiner

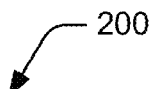
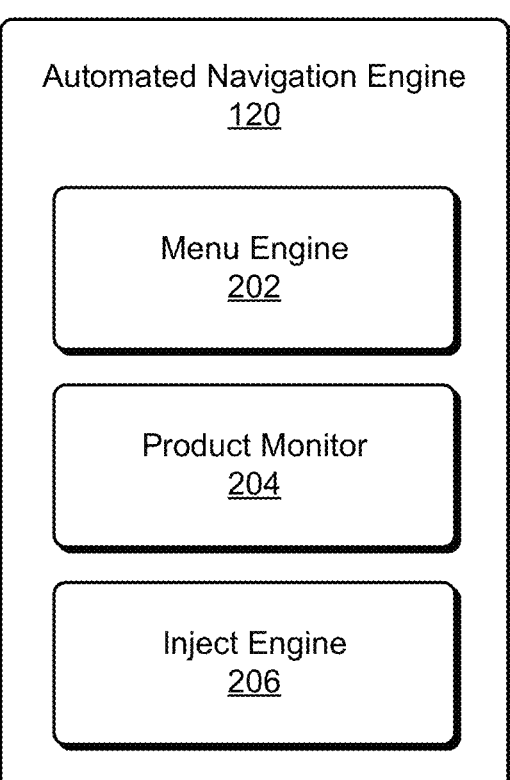
*FIG. 2*

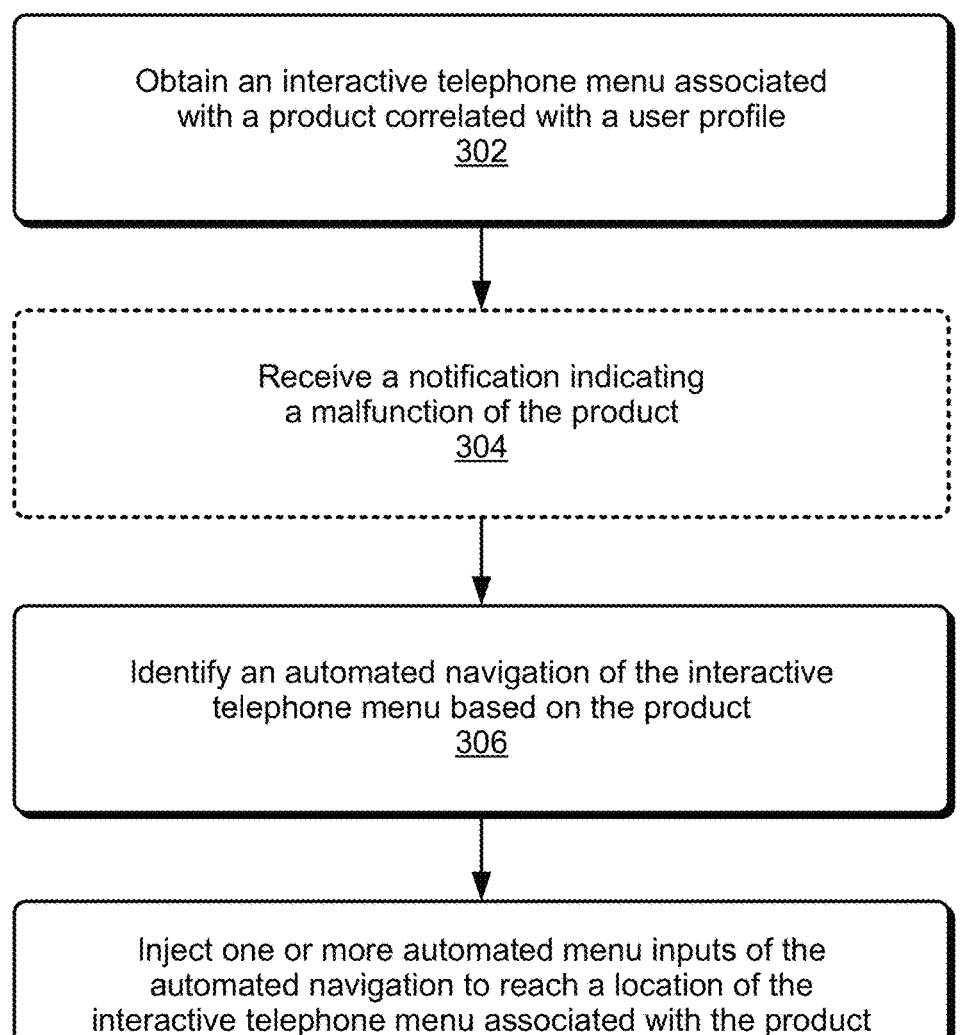

┌──────────────────────────────────────────┐
│ Obtain an interactive telephone menu associated │
│ with a product correlated with a user profile │
│ 302 │
└──────────────────────────────────────────┘

┌ ─ ─ ─ ─ ─ ─ ─ ─ ─ ─ ─ ─ ─ ─ ─ ─ ─ ─ ─ ─ ┐
│ Receive a notification indicating │
│ a malfunction of the product │
│ 304 │
└ ─ ─ ─ ─ ─ ─ ─ ─ ─ ─ ─ ─ ─ ─ ─ ─ ─ ─ ─ ─ ┘

┌──────────────────────────────────────────┐
│ Identify an automated navigation of the interactive │
│ telephone menu based on the product │
│ 306 │
└──────────────────────────────────────────┘

┌──────────────────────────────────────────┐
│ Inject one or more automated menu inputs of the │
│ automated navigation to reach a location of the │
│ interactive telephone menu associated with the product │
│ 308 │
└──────────────────────────────────────────┘

*FIG. 3*

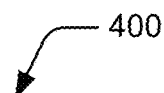
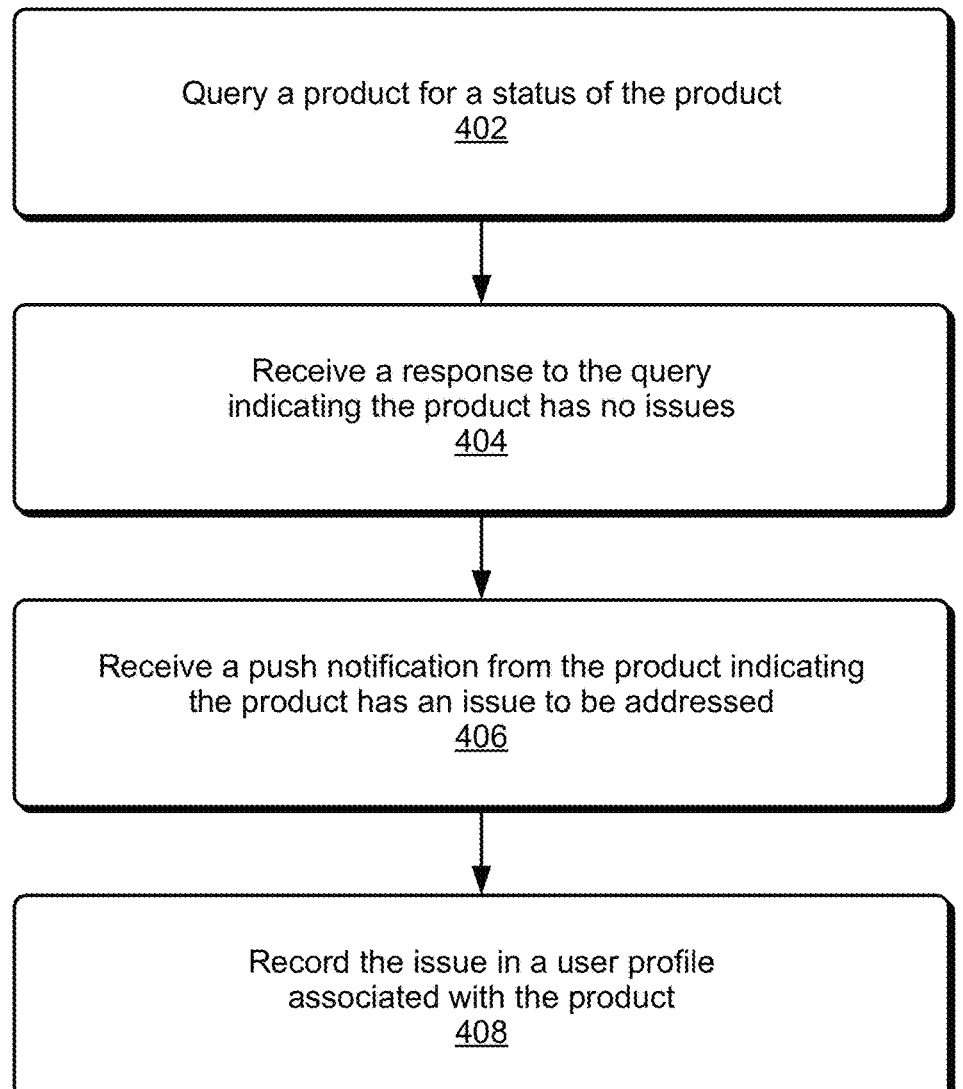
FIG. 4

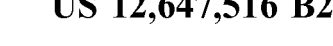
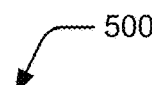

500

Analyze an interactive telephone menu associated
with a product based on a notification indicating the
product has an issue to be addressed
502

Calculate an automated navigation of the interactive
telephone menu based on the analysis
504

Display a prompt requesting acceptance
of the automated navigation
506

Dial a telephone number associated with the
interactive telephone menu based on confirmed
acceptance of the automated navigation
508

Inject automated menu inputs of the automated
navigation to reach a location of the interactive telephone
menu associated with the issue of the product
510

*FIG. 5*

CONTEXT-BASED INTERACTIVE TELEPHONE SYSTEM NAVIGATION

BACKGROUND

Interactive voice response (IVR) is a technology that allows a computer to interact with humans through the use of voice prompts for a user to enter dual tone multi frequency (DTMF) tones using number keys on a keypad. In telecommunications, IVR allows customers to interact with a company's host system via a telephone keypad, allowing the user to inquire regarding services through the IVR dialogue. IVR systems can respond to user entry with prerecorded or dynamically generated audio to direct users on how to proceed. IVR systems deployed in a network are sized to handle large call volumes and also used for outbound calling.

BRIEF DESCRIPTION OF THE DRAWINGS

Implementations of the techniques for context-based interactive telephone menu navigation are described with reference to the following Figures. The same numbers may be used throughout to reference like features and components shown in the Figures.

FIG. 2 further illustrates an example of context-based interactive telephone menu navigation in accordance with one or more implementations as described herein.

FIGS. 3-5 illustrate example methods for context-based interactive telephone menu navigation in accordance with one or more implementations of the techniques described herein.

DETAILED DESCRIPTION

Figure 1:
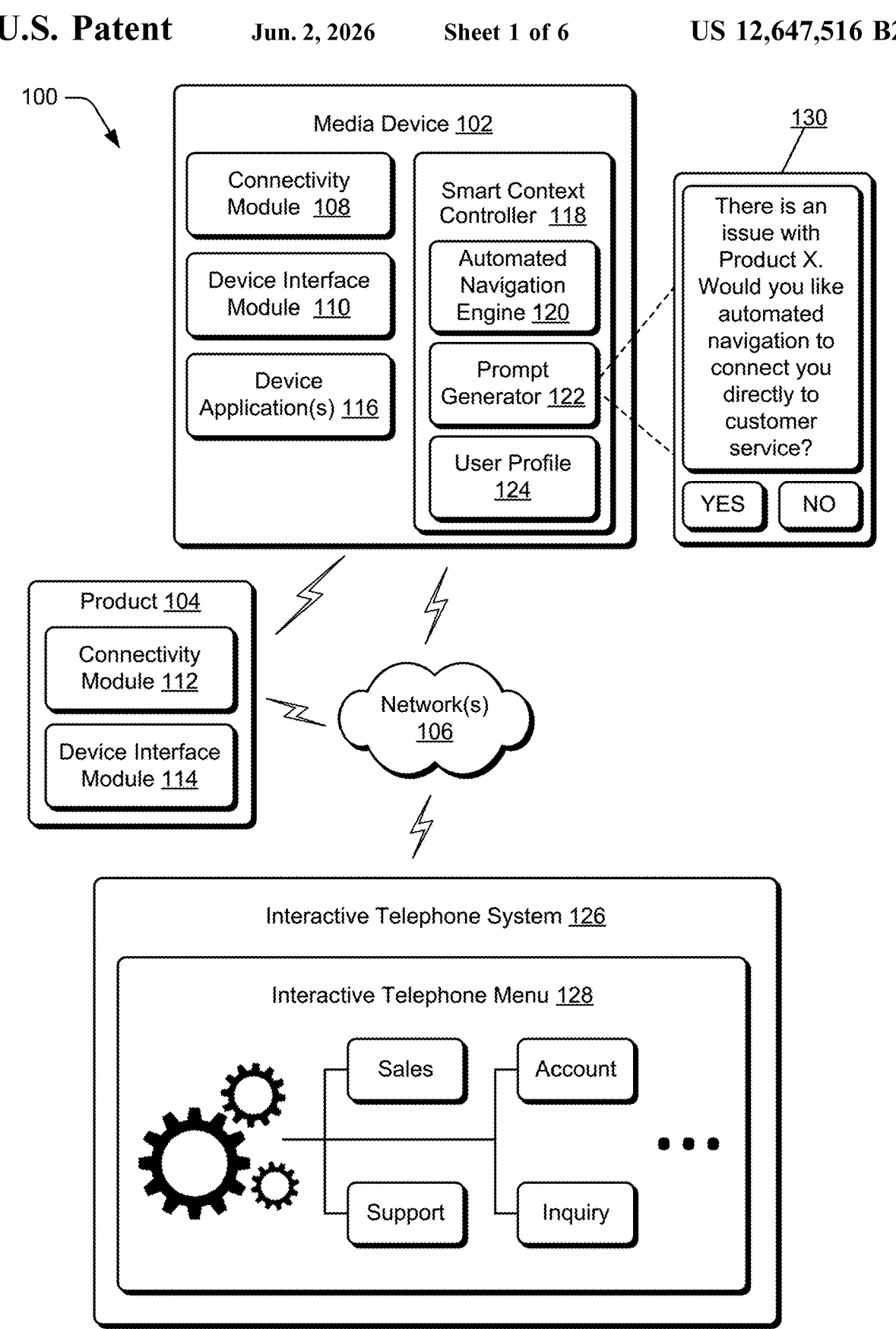
FIG. 1 illustrates an example system for context-based interactive telephone menu navigation in accordance with one or more implementations as described herein.

Implementations of the techniques for context-based interactive telephone menu navigation may be implemented as described herein. A media device such as any type of a wireless device, mobile device, mobile phone, flip phone, client device, paired device, display device, tablet, computing, communication, entertainment, gaming, media playback, and/or any other type of computing and/or electronic device, or a system of any combination of such devices, may be configured to perform techniques for context-based interactive telephone menu navigation as described herein. In some cases, at least one media device implements an instantiation of a smart context controller, providing a shortcut to a particular navigation point of an interactive telephone menu (e.g., shortcut to a live customer service representative, shortcut to a previously reached live representative of an organization, shortcut to a navigation point for dealing with a particular malfunction of a given product such as a smart phone having a flickering screen and the like). In some examples, the shortcut to the particular navigation point of the interactive telephone menu is based on the context of a problem with a product (e.g., based on a detected malfunction of a product).

To optimize resources and costs, businesses employ interactive telephone systems with interactive telephone menus such as interactive voice response (IVR) systems. In doing so, the businesses can make it nearly impossible for a caller to reach a live customer service representative. The list of options can be layered at such deep levels, that a caller can get frustrated if all the caller wants to do is to reach customer care, which results in a poor user experience. The problem can become further aggravated when the caller has reached customer care, but then the call gets disconnected for some reason and the call has to start all over again through the IVR system.

In aspects of the described techniques, a smart context controller implements interactive telephone menu navigation functionality to enable navigation for a user to a desired point of an interactive telephone menu (e.g., directly to customer service). In some examples, the interactive telephone menu navigation functionality is performed via at least one media device that implements an instantiation of the smart context controller. In aspects of the described techniques, the smart context controller implements automated navigation of the interactive telephone menu to enable a user to bypass unwanted menu options and jump directly to a desired menu option of an interactive telephone menu. In some examples, the automated navigation of the interactive telephone menu is performed via at least one media device that implements an instantiation of the smart context controller. In some cases, user input is captured by the at least one media device.

In some aspects, a user profile maintains user information. Examples of the user information include preferred spoken language, one or more products of the user, one or more services owned by the user, purchase history of a product or service, service history of a product or service, ownership status of the product or service, subscription status of the product or service (e.g., product sold, service active, service terminated), status of an order (ordered, shipping pending, shipped, out for delivery), and current functional status of the product or service (e.g., functional, not functional).

In aspects of the described techniques, the smart context controller determines an initiation of a call to an interactive telephone menu (e.g., to a customer care service contact), and provides menu options of the interactive telephone menu on behalf of the user based on information from the user profile. In one example, a washing machine is not working and a user calls customer care. On behalf of the caller, the smart context controller selects a language, indicates a product, and navigates the call directly to a menu option pertaining to a washing machine not working. Accordingly, the techniques described herein provide automated skipping of at least one of the hierarchy of menu options of an interactive telephone menu based on a context of a call in relation to a user profile.

While features and concepts of the described techniques for context-based interactive telephone menu navigation is implemented in any number of different media devices, systems, environments, and/or configurations, implementations of the techniques for context-based interactive telephone menu navigation are described in the context of the following example devices, systems, and methods.

FIG. 1 illustrates an example system 100 for context-based interactive telephone menu navigation, as described herein. The system 100 includes one or more media devices, such as a media device 102, at least one product 104, a communication network 106, and an interactive telephone system 108. Examples of media device include at least one of any type of a wireless device, mobile device, mobile phone, flip phone, client device, companion device, paired device, display device, tablet, computing device, communication device, entertainment device, gaming device, media playback device, any other type of computing and/or electronic device, and/or a system of any combination of such devices.

The media device 102 and/or the product 104 can be implemented with various components, such as a processor system and memory, as well as any number and combination of different components as further described with reference to the example device shown in FIG. 6. In implementations, the media device 102 includes various radios for wireless communication with other devices. In some examples, the media device 102 can include at least one of a BLUETOOTH® (BT) or BLUETOOTH® Low Energy (BLE) transceiver, a near field communication (NFC) transceiver, or the like. In some cases, the media device 102 includes at least one of a WI-FI® radio, a cellular radio, a global positioning satellite (GPS) radio, or any available type of device communication interface.

In this example, the system 100 includes a product 104, such as any type of computer, laptop device, desktop computer, tablet, wireless device, smart device, media device, display device, smart TV, or any other type of consumer electronic device. Additionally, or alternatively, examples of the product 104 include any type of electronic device, any type of appliance (e.g., washing machine, dryer, oven, dishwasher, refrigerator, microwave), a service (e.g., cellular service contract, Internet service contract, etc.), a subscription (e.g., streaming media subscription), or any purchased item.

Similar to the media device 102, the product 104 may be implemented with various components, such as a processor system and memory, as well as any number and combination of the different components as further described with reference to the example device shown in FIG. 6 (e.g., if the product 104 is a consumer electronic and/or computing device). In implementations, the media device 102 is communicatively linked, either by a wired or wireless connection, to the product 104. For example, the media device 102 and the product 104 are communicatively linked via the communication network 106 and/or via direct inter-device connectivity, e.g., via direct wireless and/or wired connectivity between the media device 102 and the product 104.

In some implementations, the devices, applications, modules, servers, and/or services described herein communicate via the communication network 106, such as for data communication between the media device 102 and the product 104. The communication network 106 includes a wired and/or a wireless network. The communication network 106 is implemented using any type of network topology and/or communication protocol, and is represented or otherwise implemented as a combination of two or more networks, to include IP-based networks, cellular networks, and/or the Internet. The communication network 106 includes mobile operator networks that are managed by a mobile network operator and/or other network operators, such as a communication service provider, mobile phone provider, and/or Internet service provider.

The media device 102 includes various functionality that enables the device to implement different aspects of context-based interactive telephone menu navigation, as described herein. In this example, the media device 102 includes a connectivity module 110 and a device interface module 112. The connectivity module 110 represents functionality (e.g., logic and/or hardware) enabling the media device 102 to interconnect with other devices and/or networks, such as the product 104 and the communication network 106. For example, the connectivity module 110 enables wireless and/or wired connectivity of the media device 102. The device interface module 112 represents functionality enabling the media device 102 to interface with other devices. As further detailed below, the device interface module 112 enables the media device 102 to establish wireless and/or wired data communication with other devices, such as the product 104 or similar presentation device.

Similarly, the product 104 includes various functionality that enables the product 104 to implement different aspects of context-based interactive telephone menu navigation, as described herein. In this example, the product 104 includes a device connectivity module 114 and a device interface module 116. The device connectivity module 114 represents functionality (e.g., logic and/or hardware) enabling the product 104 to interconnect with other devices and/or networks, such as the media device 102 and the communication network 106. For example, the device connectivity module 114 enables wireless and/or wired connectivity of the product 104. The device interface module 116 represents functionality enabling the product 104 to interface with other devices. As further detailed below, the device interface module 116 enables the product 104 to establish wireless and/or wired data communication with other devices, such as the media device 102 or similar devices.

In some examples, the product 104 communicates any of various types of content to the media device 102, and vice versa. In implementations, the product 104 outputs a status of the product 104 to the media device 102. The media device 102 and/or the product 104 can include and implement device applications 118, such as any type of messaging application, email application, video communication application, cellular communication application, music/audio application, gaming application, media application, social platform applications, and/or any other of the many possible types of device applications. Many of the device applications 118 have an associated application user interface that is generated and displayed for user interaction and viewing, such as on a display screen of the media device 102 and/or on a display of the product 104.

In the example system 100 for context-based interactive telephone menu navigation, the media device 102 incorporates interactive telephone menu navigation. As shown, the media device 102 implements an instantiation of a smart context controller 120 (e.g., as a device application 114). As shown, the smart context controller 120 includes an automated navigation engine 122, a prompt generator 124, and a user profile 126. The smart context controller 120 represents functionality (e.g., logic, software, and/or hardware) enabling implementation of described techniques for context-based interactive telephone menu navigation. The smart context controller 120 can be implemented as computer instructions stored on computer-readable storage media and can be executed by a processor system of the media device 102. Alternatively or in addition, the smart context controller 120 can be implemented at least partially in hardware of a device.

In one or more implementations, the smart context controller 120 includes independent processing, memory, and/or logic components functioning as a computing and/or electronic device integrated with the media device 102. Alternatively or in addition, the smart context controller 120 can be implemented in software, in hardware, or as a combination of software and hardware components. In this example, the smart context controller 120 is implemented as a software application or module, such as executable software instructions (e.g., computer-executable instructions) that are executable with a processor system of the media device 102 to implement the techniques and features described herein. As a software application or module, the smart context controller 120 can be stored on computer-readable storage memory (e.g., memory of a device), or in any other suitable memory device or electronic data storage implemented with the module. Alternatively or in addition, the smart context controller 120 is implemented in firmware and/or at least partially in computer hardware. For example, at least part of the smart context controller 120 is executable by a computer processor, and/or at least part of the content manager is implemented in logic circuitry.

In this example, the interactive telephone system 108 includes an interactive telephone menu 128. In implementations, the smart context controller 120 obtains an interactive telephone menu 128 associated with a product correlated with a user profile. In some implementations, the smart context controller 120 is configured to search for the interactive telephone menu 128 (e.g., via the Internet). Upon identifying the interactive telephone menu 128 from the search, the smart context controller 120 downloads and stores the interactive telephone menu 128 in the user profile 126. In some examples, the smart context controller 120 is configured to execute a computer program (e.g., device applications 118) that connects to the interactive telephone system 108 (e.g., dials the interactive telephone system 108) and discovers the entire set of menu options of the interactive telephone menu 128 by traversing each menu option. In some implementations, the user profile includes at least one of a preferred language, the interactive telephone menu, the product, a unique identifier to the product, an ownership status of the product, a functional status of the product, a status update of the product, the notification indicating the malfunction, or a telephone number associated with customer service of the product.

In various examples, the smart context controller 120 receives a notification (e.g., a push notification) from the product 104 indicating a malfunction of the product 104. In some cases, the smart context controller 120 queries the product 104 and discovers the malfunction based on the query. In some implementations, the smart context controller 120 identifies an automated navigation of the interactive telephone menu based on the malfunction of the product. In some cases, the smart context controller 120 generates the automated navigation based on the smart context controller 120 identifying a navigation point of the interactive telephone menu that corresponds to the malfunction of the product 104 and generating the automated navigation that directs the call to that navigation point. In some examples, the smart context controller 120 injects one or more automated menu inputs of the automated navigation to reach a navigation point of the interactive telephone menu associated with the malfunction of the product.

In one or more implementations, the smart context controller 120 generates a prompt 130 (e.g., via the prompt generator 124) that requests acceptance of the automated navigation. Upon receiving a selectable input indicating the acceptance of the automated navigation, the smart context controller 120 provides the automated navigation.

In various examples, the product 104 is at least one of a consumer product, an electronic device, an appliance, a service, a subscription, or a purchased item. In some cases, the interactive telephone menu 128 is associated with a provider of the product 104. The provider includes at least one of a manufacturer of the product 104, a retailer of the product 104, or a service provider of the product 104.

FIG. 2 illustrates example 200 of context-based interactive telephone menu navigation, as described herein. As shown, the automated navigation engine 122 includes a menu engine 202, a product monitor 204, and an inject engine 206. In some examples, the automated navigation engine 122 enables context-based interactive telephone menu navigation.

In one or more implementations, the menu engine 202 obtains an interactive telephone menu associated with a product correlated with a user profile. For example, menu engine obtains the interactive telephone menu 128 associated with the product 104 that is a product listed in the user profile 126. In some cases, the product monitor 204 receives a notification indicating a malfunction of the product. In various implementations, the inject engine 206 identifies an automated navigation of the interactive telephone menu based on the malfunction of the product and injects one or more automated menu inputs of the automated navigation to reach a navigation point of the interactive telephone menu associated with the malfunction of the product.

In various examples, the menu engine 202 acquires the interactive telephone menu by recording a user interacting with the interactive telephone menu. In some cases, the menu engine 202 acquires the interactive telephone menu by connecting to the interactive telephone menu and navigating each of the menu options of the interactive telephone menu. In some examples, the menu engine 202 acquires the interactive telephone menu by downloading the interactive telephone menu from a server (e.g., downloading the interactive telephone menu 128 from the interactive telephone system 108).

In one or more examples, the product monitor 204 monitors a product. Based on the monitoring, the product monitor 204 identifies an issue (e.g., malfunction) with the product. In some cases, the product monitor 204 receives a notification indicating the issue with the product. In some implementations, the product monitor 204 receives the notification from the product. In one or more implementations, the inject engine 206 detects a dialing of a telephone number that is associated with an interactive telephone menu associated with the identified issue and offers automated navigation of the interactive telephone menu. In one or more examples, the inject engine 206 displays a prompt to initiate a call and provide automated navigation of the interactive telephone menu. In one or more implementations, the inject engine 206 generates the prompt based on the notification from the product.

In some implementations, the product monitor 204 receives a first notification indicating an issue of a first product stored in the user profile and receives a second notification indicating an issue of a second product stored in the user profile. In some examples, the first product and the second product are associated with the same interactive telephone menu. In one or more implementations, the menu engine 202 calculates a first automated navigation of the interactive telephone menu based on the first notification and calculates a second automated navigation of the interactive telephone menu based on the second notification. In some cases, the menu engine 202 (e.g., in conjunction with the prompt generator 124) displays a prompt offering to optionally execute the first automated navigation for the first product or optionally execute the second automated navigation for the second product. Based on a user selection, the menu engine 202 traverses the interactive telephone menu with menu inputs provided by the inject engine 206 according to the selected automated navigation.

Example methods 300, 400, and 500 are described with reference to respective FIGS. 3, 4, and 5 in accordance with one or more implementations of context-based interactive telephone menu navigation, as described herein. Generally, any services, components, modules, managers, controllers, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FP-GAs), Application-specific Integrated Circuits (ASICs), Application-specific Standard Products (ASSPs), System-on-a-chip systems (SoCs), Complex Programmable Logic Devices (CPLDs), and the like.

FIG. 3 illustrates example method(s) 300 for context-based interactive telephone menu navigation. The order in which the method is described is not intended to be construed as a limitation, and any number or combination of the described method operations may be performed in any order to perform a method, or an alternate method.

At 302, the method 300 includes obtaining an interactive telephone menu associated with a product correlated with a user profile. For example, the smart context controller 120 acquires the interactive telephone menu and stores it in a user profile, associating the interactive telephone menu with at least one product stored in the user profile.

At 304, the method 300 optionally includes receiving a notification indicating a malfunction of the product. In one or more examples, the smart context controller 120 receives a notification of the malfunction from the product or the smart context controller 120 queries the product and determines the malfunction based on the query.

At 306, the method 300 includes identifying an automated navigation of the interactive telephone menu based on the product. For example, the smart context controller 120 determines the product and identifies a navigation point in the interactive telephone menu associated with the product. In one or more examples, the smart context controller 120 determines a malfunction of the product and identifies a navigation point in the interactive telephone menu associated with the malfunction of the product. The smart context controller 120 then generates automated navigation to shortcut a telephone call to the identified navigation point.

At 308, the method 300 includes injecting one or more automated menu inputs of the automated navigation to reach a navigation point of the interactive telephone menu associated with the product (e.g., the status of the product, a previous call associated with the product, the malfunction of the product, etc.). For example, the smart context controller 120 identifies the one or more automated menu inputs of the automated navigation that directs a call to the navigation point and provides the one or more automated menu inputs accordingly.

FIG. 4 illustrates example method(s) 400 for context-based interactive telephone menu navigation. The order in which the method is described is not intended to be construed as a limitation, and any number or combination of the described method operations may be performed in any order to perform a method, or an alternate method.

At 402, the method 400 includes querying a product for a status of the product. For example, the smart context controller 120 establishes a communicative link with a product associated with a user profile and monitors the product based on the established communicative link. Based on the monitoring, the smart context controller 120 queries the product and receives a response to the query.

At 404, the method 400 includes receiving a response to the query indicating the product has no issues. For example, the smart context controller 120 receives the response to the query and determines the response indicates the product has no issues.

At 406, the method 400 includes receiving a push notification from the product indicating the product has an issue to be addressed (e.g., a malfunction). In one or more implementations, the smart context controller 120 receives the push notification after receiving the response to the query, and determines the push notification indicates the product now has an issue to be addressed.

At 408, the method 400 includes recording the issue in a user profile associated with the product. For example, the smart context controller 120 logs the issue in the user profile under an entry associated with the product.

FIG. 5 illustrates example method(s) 500 for context-based interactive telephone menu navigation. The order in which the method is described is not intended to be construed as a limitation, and any number or combination of the described method operations may be performed in any order to perform a method, or an alternate method.

At 502, the method 500 includes analyzing an interactive telephone menu associated with a product based on a notification indicating the product has an issue to be addressed. For example, the smart context controller 120 analyzes the menu options of the interactive telephone menu in relation to the issue (e.g., the issue indicated in the push notification of 406).

At 504, the method 500 includes calculating an automated navigation of the interactive telephone menu based on the analysis. For example, the smart context controller 120 identifies a navigation point of the interactive telephone menu associated with the issue based on the smart context controller 120 analyzing the menu options of the interactive telephone menu and determining the navigation point correlates to resolving the issue.

At 506, the method 500 includes displaying a prompt requesting acceptance of the automated navigation. For example, the smart context controller 120 generates a prompt and displays the prompt on a display (e.g., of media device 102). In some cases, the prompt indicates the issue with the product (e.g., a malfunctioning dishwasher) and the navigation point associated with the issue (e.g., customer service for troubleshooting a malfunctioning dishwasher).

At 508, the method 500 includes dialing a telephone number associated with the interactive telephone menu based on confirmed acceptance of the automated navigation. For example, the smart context controller 120 identifies the telephone number in an entry for the product stored in the user profile. The smart context controller 120 then dials the telephone number based on the user accepting the automated navigation.

At 510, the method 500 includes injecting automated menu inputs of the automated navigation to reach a navigation point of the interactive telephone menu associated with the issue of the product. For example, after connecting to the interactive telephone menu, the smart context controller 120 enters each menu option that directs the call to the navigation point associated with the issue.

Figure 6:
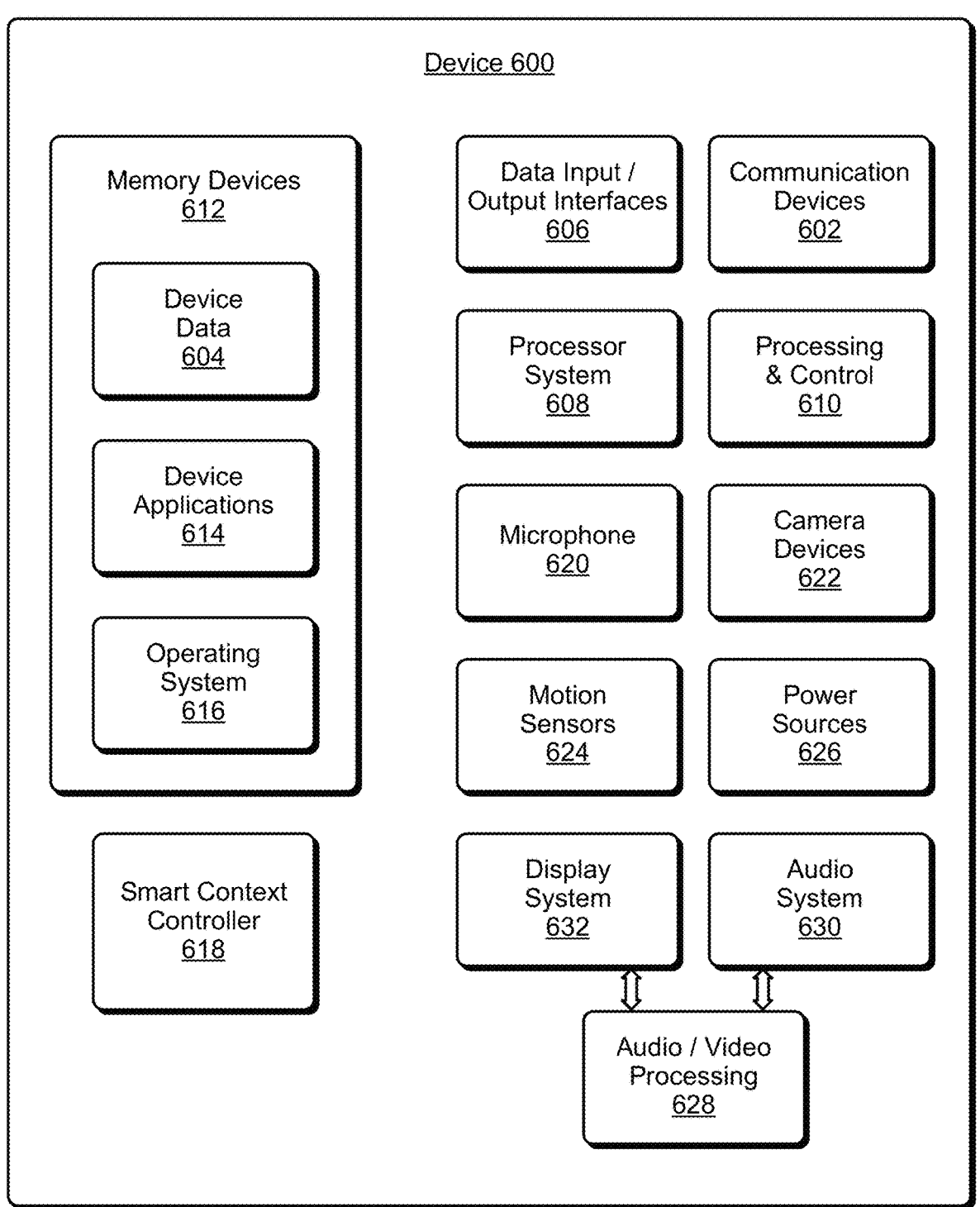
FIG. 6 illustrates various components of an example device that may be used to implement the techniques for context-based interactive telephone menu navigation as described herein.

FIG. 6 illustrates various components of an example device 600, which can implement aspects of the techniques and features for context-based interactive telephone menu navigation, as described herein. The example device 600 may be implemented as any of the devices described with reference to the previous FIGS. 1-5, such as any type of a wireless device, mobile device, mobile phone, flip phone, client device, companion device, paired device, display device, tablet, computing, communication, entertainment, gaming, media playback, and/or any other type of computing and/or electronic device. For example, the media device 102 and/or the product 104 described with reference to FIGS. 1-5 may be implemented as the example device 600.

The example device 600 can include various, different communication devices 602 that enable wired and/or wireless communication of device data 604 with other devices. The device data 604 can include any of the various devices data and content that is generated, processed, determined, received, stored, and/or communicated from one computing device to another. Generally, the device data 604 can include any form of audio, video, image, graphics, and/or electronic data that is generated by applications executing on a device. The communication devices 602 can also include transceivers for cellular phone communication and/or for any type of network data communication.

The example device 600 can also include various, different types of data input/output (I/O) interfaces 606, such as data network interfaces that provide connection and/or communication links between the devices, data networks, and other devices. The I/O interfaces 606 may be used to couple the device to any type of components, peripherals, and/or accessory devices, such as a computer input device that may be integrated with the example device 600. The I/O interfaces 606 may also include data input ports via which any type of data, information, media content, communications, messages, and/or inputs may be received, such as user inputs to the device, as well as any type of audio, video, image, graphics, and/or electronic data received from any content and/or data source.

The example device 600 includes a processor system 608 of one or more processors (e.g., any of microprocessors, controllers, and the like) and/or a processor and memory system implemented as a system-on-chip (SoC) that processes computer-executable instructions. The processor system 608 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively, or in addition, the device may be implemented with any one or combination of software, hardware, firmware, or fixed logic circuitry that may be implemented in connection with processing and control circuits, which are generally identified at 610. The example device 600 may also include any type of a system bus or other data and command transfer system that couples the various components within the device. A system bus can include any one or combination of different bus structures and architectures, as well as control and data lines.

The example device 600 also includes memory and/or memory devices 612 (e.g., computer-readable storage memory) that enable data storage, such as data storage devices implemented in hardware which may be accessed by a computing device, and that provide persistent storage of data and executable instructions (e.g., software applications, programs, functions, and the like). Examples of the memory devices 612 include volatile memory and non-volatile memory, fixed and removable media devices, and any suitable memory device or electronic data storage that maintains data for computing device access. The memory devices 612 can include various implementations of random-access memory (RAM), read-only memory (ROM), flash memory, and other types of storage media in various memory device configurations. The example device 600 may also include a mass storage media device.

The memory devices 612 (e.g., as computer-readable storage memory) provide data storage mechanisms, such as to store the device data 604, other types of information and/or electronic data, and various device applications 614 (e.g., software applications and/or modules). For example, an operating system 616 may be maintained as software instructions with a memory device 612 and executed by the processor system 608 as a software application. The device applications 614 may also include a device manager, such as any form of a control application, software application, signal-processing and control module, code that is specific to a particular device, a hardware abstraction layer for a particular device, and so on.

In this example, the device 600 includes a smart context controller 618 that implements various aspects of the described features and techniques described herein. In some examples, the smart context controller 618 is implemented with hardware components and/or in software as one of the device applications 614, such as when the example device 600 is implemented as the media device 102 and/or the product 104 described with reference to FIGS. 1-5. An example of the smart context controller 618 is the smart context controller 120 implemented by the media device 102 and/or the product 104, such as a software application and/or as hardware components in the media device. In implementations, the smart context controller 618 may include independent processing, memory, and logic components as a computing and/or electronic device integrated with the example device 600.

The example device 600 can also include a microphone 620 (e.g., to capture an audio recording of a user) and/or camera devices 622 (e.g., to capture video images of the user during a call), as well as motion sensors 624, such as may be implemented as components of an inertial measurement unit (IMU). The motion sensors 624 may be implemented with various sensors, such as a gyroscope, an accelerometer, and/or other types of motion sensors to sense motion of the device. The motion sensors 624 can generate sensor data vectors having three-dimensional parameters (e.g., rotational vectors in x, y, and z-axis coordinates) indicating location, position, acceleration, rotational speed, and/or orientation of the device. The example device 600 can also include one or more power sources 626, such as when the device is implemented as a wireless device and/or mobile device. The power sources may include a charging and/or power system, and may be implemented as a flexible strip battery, a rechargeable battery, a charged super-capacitor, and/or any other type of active or passive power source.

The example device 600 can also include an audio and/or video processing system 628 that generates audio data for an audio system 630 and/or generates display data for a display system 632. The audio system and/or the display system may include any types of devices or modules that generate, process, display, and/or otherwise render audio, video, display, and/or image data. Display data and audio signals may be communicated to an audio component and/or to a display component via any type of audio and/or video connection or data link. In implementations, the audio system and/or the display system are integrated components of the example device 600. Alternatively, the audio system and/or the display system are external, peripheral components to the example device.

Although implementations for context-based interactive telephone menu navigation have been described in language specific to features and/or methods, the appended claims are not necessarily limited to the specific features or methods described. Rather, the specific features and methods are disclosed as example implementations for context-based interactive telephone menu navigation, and other equivalent features and methods are intended to be within the scope of the appended claims. Further, various different examples are described, and it is to be appreciated that each described example may be implemented independently or in connection with one or more other described examples. Additional aspects of the techniques, features, and/or methods discussed herein relate to one or more of the following:

A method comprising: obtaining an interactive telephone menu associated with a product correlated with a user profile; identifying an automated navigation of the interactive telephone menu based on the product; and injecting one or more automated menu inputs of the automated navigation to reach a navigation point of the interactive telephone menu associated with the product.

Alternatively, or in addition to the above-described method, any one or combination of: identifying is based on detecting a dialing of a telephone number associated with the interactive telephone menu. The injecting is based on prompting for acceptance of the automated navigation and receiving a selectable input indicating the acceptance of the automated navigation. The obtaining the interactive telephone menu includes at least one of: recording a user interaction with the interactive telephone menu, connecting to the interactive telephone menu and navigating menu options of the interactive telephone menu, or downloading the interactive telephone menu from a server. The user profile includes at least one of a preferred language, the interactive telephone menu, the product, a unique identifier of the product, an ownership status of the product, a functional status of the product, a status update of the product, a notification indicating a malfunction of the product, or a telephone number associated with customer service of the product. The notification indicating the malfunction of the product is received from the product. The method further comprising receiving an additional notification indicating a malfunction of an additional product stored in the user profile and associated with the interactive telephone menu. The method further comprising identifying an additional automated navigation of the interactive telephone menu for the malfunction of the additional product and providing a prompt offering to execute at least one of the automated navigation for the malfunction of the product or the additional automated navigation for the malfunction of the additional product. The product is at least one of a consumer product, an electronic device, an appliance, a service, a subscription, or a purchased item. The interactive telephone menu is associated with a provider of the product, the provider including a manufacturer of the product, a retailer of the product, or a service provider of the product.

A media device, comprising: a memory to maintain a user profile of interactive telephone menus and product information; and a processor coupled with the memory, the processor configured to cause the media device to: obtain an interactive telephone menu associated with a product correlated with the user profile; identify an automated navigation of the interactive telephone menu based on the product; and inject one or more automated menu inputs of the automated navigation to reach a navigation point of the interactive telephone menu associated with the product Alternatively, or in addition to the above-described media device, any one or combination of: the processor is further configured to cause the media device to detect a dialing of a telephone number associated with the interactive telephone menu. To inject the one or more automated menu inputs of the automated navigation, the processor is configured to cause the media device to prompt for acceptance of the automated navigation and receive a selectable input indicating the acceptance of the automated navigation. The processor is further configured to cause the media device to perform at least one of: record a user interaction with the interactive telephone menu, connect to the interactive telephone menu and navigate menu options of the interactive telephone menu, or download the interactive telephone menu from a server. The user profile includes at least one of a preferred language, the interactive telephone menu, the product, a unique identifier of the product, an ownership status of the product, a functional status of the product, a status update of the product, a notification indicating a malfunction of the product, or a telephone number associated with customer service of the product. The notification that indicates the malfunction of the product is received from the product.

A non-transitory computer-readable medium storing code, the code comprising instructions executable by a processor of a media device to: obtain an interactive telephone menu associated with a product correlated with a user profile; receive a notification that indicates a malfunction of the product; identify an automated navigation of the interactive telephone menu based on the malfunction of the product; and inject one or more automated menu inputs of the automated navigation to reach a navigation point of the interactive telephone menu associated with the malfunction of the product.

Alternatively, or in addition to the above-described system, any one or combination of the code includes instructions further executable by the processor to detect an initiation of a telephone number associated with the interactive telephone menu. The code includes instructions further executable by the processor to prompt for acceptance of the automated navigation and receive a selectable input that indicates the acceptance of the automated navigation. The code includes instructions further executable by the processor to perform at least one of: record a user interaction with the interactive telephone menu, connect to the interactive telephone menu and navigate menu options of the interactive telephone menu, or download the interactive telephone menu from a server.

The invention claimed is:

1. A method, comprising:
receiving, from a product owned by a user, a notification indicating a malfunction of the product;
obtaining an interactive telephone menu associated with the product correlated with a user profile of the user;
identifying, automatically responsive to a telephone call that has been initiated, one or more menu options into an automated navigation of the interactive telephone menu based on the product; and
injecting, without user input, one or more automated menu inputs of the automated navigation to bypass the one or more menu options and reach a navigation point of the interactive telephone menu associated with the product.

2. The method of claim 1, wherein the identifying is based on detecting a dialing of a telephone number associated with the interactive telephone menu.

3. The method of claim 1, wherein the injecting is based on:

prompting for acceptance of the automated navigation; and receiving a selectable input indicating the acceptance of the automated navigation.

4. The method of claim 1, wherein the obtaining the interactive telephone menu includes at least one of:

recording a user interaction with the interactive telephone menu;

connecting to the interactive telephone menu and navigating menu options of the interactive telephone menu; or downloading the interactive telephone menu from a server.

5. The method of claim 1, wherein the user profile includes at least one of a preferred language, the interactive telephone menu, the product, a unique identifier of the product, an ownership status of the product, a functional status of the product, a status update of the product, the notification indicating the malfunction of the product, or a telephone number associated with customer service of the product.

6. The method of claim 5, further comprising receiving an additional notification indicating a malfunction of an additional product stored in the user profile and associated with the interactive telephone menu.

7. The method of claim 6, further comprising:

identifying an additional automated navigation of the interactive telephone menu for the malfunction of the additional product; and providing a prompt offering to execute at least one of the automated navigation for the malfunction of the product or the additional automated navigation for the malfunction of the additional product.

8. The method of claim 1, wherein the product is at least one of a consumer product, an electronic device, an appliance, a service, a subscription, or a purchased item.

9. The method of claim 1, wherein the interactive telephone menu is associated with a provider of the product, the provider including a manufacturer of the product, a retailer of the product, or a service provider of the product.

10. A media device, comprising:

a memory to maintain a user profile of interactive telephone menus and product information; and a processor coupled with the memory, the processor configured to cause the media device to:

receive, from a product owned by a user, a notification indicating a malfunction of the product;

obtain an interactive telephone menu associated with the product correlated with the user profile of the user;

identify, automatically responsive to a telephone call that has been initiated, one or more menu options into an automated navigation of the interactive telephone menu based on the product; and inject, without user input, one or more automated menu inputs of the automated navigation to bypass the one or more menu options and reach a navigation point of the interactive telephone menu associated with the product.

11. The media device of claim 10, wherein the processor is further configured to cause the media device to detect a dialing of a telephone number associated with the interactive telephone menu.

12. The media device of claim 10, wherein to inject the one or more automated menu inputs of the automated navigation, the processor is configured to cause the media device to:

prompt for acceptance of the automated navigation; and receive a selectable input indicating the acceptance of the automated navigation.

13. The media device of claim 10, wherein the processor is further configured to cause the media device to perform at least one of:

record a user interaction with the interactive telephone menu;

connect to the interactive telephone menu and navigating menu options of the interactive telephone menu; or download the interactive telephone menu from a server.

14. The media device of claim 10, wherein the user profile includes at least one of a preferred language, the interactive telephone menu, the product, a unique identifier of the product, an ownership status of the product, a functional status of the product, a status update of the product, the notification indicating the malfunction of the product, or a telephone number associated with customer service of the product.

15. A non-transitory computer-readable medium storing code, the code comprising instructions executable by a processor of a media device to:

receive, from a product owned by a user, a notification indicating a malfunction of the product;

obtain an interactive telephone menu associated with the product correlated with a user profile of the user;

identify, automatically responsive to a telephone call that has been initiated, one or more menu options into an automated navigation of the interactive telephone menu based on the malfunction of the product; and inject, without user input, one or more automated menu inputs of the automated navigation to bypass the one or more menu options and reach a navigation point of the interactive telephone menu associated with the malfunction of the product.

16. The non-transitory computer-readable medium of claim 15, wherein the code includes the instructions further executable by the processor to detect an initiation of a telephone number associated with the interactive telephone menu.

17. The non-transitory computer-readable medium of claim 15, wherein the code includes the instructions further executable by the processor to:

prompt for acceptance of the automated navigation; and receive a selectable input that indicates the acceptance of the automated navigation.

18. The non-transitory computer-readable medium of claim 15, wherein the code includes the instructions further executable by the processor to perform at least one of:

record a user interaction with the interactive telephone menu;

connect to the interactive telephone menu and navigate menu options of the interactive telephone menu; or download the interactive telephone menu from a server.

19. The non-transitory computer-readable medium of claim 15, wherein the product is at least one of a consumer product, an electronic device, an appliance, a service, a subscription, or a purchased item.

20. The non-transitory computer-readable medium of claim 15, wherein the interactive telephone menu is associated with a provider of the product, the provider including a manufacturer of the product, a retailer of the product, or a service provider of the product.

* * * * *